(12) United States Patent
Yang et al.

(10) Patent No.: US 9,714,025 B2
(45) Date of Patent: Jul. 25, 2017

(54) METHOD AND APPARATUS FOR CONTROLLING BATTERY CHARGE OF MOTOR SYSTEM

(71) Applicant: Hyundai Motor Company, Seoul (KR)

(72) Inventors: Dong Ho Yang, Incheon (KR); Young Chul Kim, Seoul (KR); Sang Joon Kim, Seuol (KR)

(73) Assignee: Hyundai Motor Company, Seoul (KR)

( * ) Notice: Subject to any disclaimer, the term of this patent is extended or adjusted under 35 U.S.C. 154(b) by 35 days.

(21) Appl. No.: 15/014,242

(22) Filed: Feb. 3, 2016

(65) Prior Publication Data

US 2017/0137016 A1 May 18, 2017

(30) Foreign Application Priority Data

Nov. 17, 2015 (KR) ........................ 10-2015-0161068

(51) Int. Cl.
| | | |
|---|---|---|
| *B60W 10/06* | (2006.01) | |
| *B60W 20/13* | (2016.01) | |
| *B60W 10/08* | (2006.01) | |
| *G06F 19/00* | (2011.01) | |

(52) U.S. Cl.
CPC ............ *B60W 20/13* (2016.01); *B60W 10/06* (2013.01); *B60W 10/08* (2013.01); *B60W 2710/0666* (2013.01); *B60W 2710/086* (2013.01); *B60W 2710/244* (2013.01); *B60Y 2200/92* (2013.01); *B60Y 2300/91* (2013.01); *Y10S 903/93* (2013.01)

(58) Field of Classification Search
CPC ...... B60W 20/13; B60W 10/06; B60W 10/08; Y10S 903/93

USPC ............................................. 701/22; 320/132
See application file for complete search history.

(56) References Cited

U.S. PATENT DOCUMENTS

| | | | | |
|---|---|---|---|---|
| 2003/0025479 A1* | 2/2003 | Kikuchi | ................ | H02J 7/0047 320/134 |
| 2014/0303820 A1* | 10/2014 | Aoki | ..................... | B60W 10/08 701/22 |
| 2015/0331060 A1* | 11/2015 | Eifert | ................. | G01R 31/3675 320/132 |

FOREIGN PATENT DOCUMENTS

| | | |
|---|---|---|
| JP | 2010-195081 A | 9/2010 |
| JP | 2012-232611 A | 11/2012 |
| JP | 2013-107539 A | 6/2013 |
| JP | 2013-115937 A | 6/2013 |
| JP | 2013-129306 A | 7/2013 |
| JP | 2014-040199 A | 3/2014 |
| JP | 5475154 B2 | 4/2014 |
| JP | 2014-101048 A | 6/2014 |

\* cited by examiner

*Primary Examiner* — Tan Q Nguyen
(74) *Attorney, Agent, or Firm* — Mintz Levin Cohn Ferris Glovsky and Popeo, P.C.; Peter F. Corless

(57) ABSTRACT

A motor control method is provided and includes reducing first power generated by a first motor and operating a second motor to generate second power corresponding to the reduced first power when a temperature of the first motor is greater than a first temperature. Additionally, generation of the first power by the first motor is suspended and the second power is generated by the second motor when the temperature of the first motor is greater than a second temperature. Generation of the second power by the second motor is suspended when at least one of the temperature of the first motor and a temperature of the second motor is greater than a third temperature.

17 Claims, 4 Drawing Sheets

METHOD AND APPARATUS FOR CONTROLLING BATTERY CHARGE OF MOTOR SYSTEM

CROSS REFERENCE TO RELATED APPLICATION(S)

This application claims the benefit of Korean Patent Application No. 10-2015-0161068, filed on Nov. 17, 2015, which is hereby incorporated by reference as if fully set forth herein.

BACKGROUND

Field of the Invention

The present invention relates to a plug-in hybrid electric vehicle (PHEV), and more particularly, to a method and apparatus for controlling a battery charge of a motor system of the PHEV.

Discussion of the Related Art

A plug-in hybrid electric vehicle (PHEV) may employ an electric motor in addition to an engine as a power source to reduce exhaust gas and enhance fuel efficiency. The PHEV may be driven in various different driving modes such as an electric vehicle (EV) mode that corresponds to a mode of a pure electric vehicle using power of a motor, a hybrid electric vehicle (HEV) mode in which a torque of a driving motor is used as auxiliary power while torque of an engine is used as main power, and a charging mode in which the vehicle may be driven while a battery is charged by converting mechanical energy of the engine into electric energy during driving.

In this way, the PHEV may supply power using electric energy of the battery together with mechanical energy of the engine as a power source, and generate electric energy from the motor during driving, and thus may enhance fuel efficiency of the vehicle and efficiently use energy. The PHEV includes a driving motor and a hybrid starter & generator (HSG) motor. The driving motor mainly delivers power to the vehicle, and the HSG motor mainly starts the engine and functions as a generator. Both motors may supply power to the PHEV together with the engine, and function as a generator configured to convert mechanical energy of the engine into electric energy.

Meanwhile, the PHEV using the driving motor may have an overheated motor, a temperature of which increases to more than a particular level, while the driving motor is driven or energy is generated from the driving motor. Specifically, the motor may be overheated due to heat loss that occurs in a process of generating electric energy from kinetic energy, and a temperature of the motor may increase due to driving and generation for a substantial period of time when the motor has a substantial heat value in comparison with cooling capacity.

When a temperature of the driving motor increases due to excessive generation, several problems may occur. For example, charging of the battery may be suspended due to an excessively high temperature of the driving motor during driving in the charging mode. In addition, even when the battery is sufficiently charged, the excessively high temperature of the motor may cause burning of a component and may affect operation of the motor. Thus, there may be a limit in driving the PHEV in the EV mode from the viewpoint of a system.

SUMMARY

Accordingly, the present invention provides a method and apparatus for controlling battery charge of a motor system that substantially obviate one or more problems due to limitations and disadvantages of the related art. Specifically, the present invention provides a method and apparatus for controlling battery charge of a motor system for distributing a driving torque output from an engine to a driving motor and an HSG motor to prevent the driving motor from being overheated. Technical problems to be solved by the present invention are not limited to the above-mentioned technical problems, and other technical problems not mentioned herein may be clearly understood by those skilled in the art from description below.

In accordance with the purpose of the invention, as embodied and broadly described herein, a motor control method may include performing a first control operation by a controller to reduce first power generated by a first motor is reduced and to operate a second motor to generate second power that corresponds to the reduced first power when a temperature of the first motor is greater than a first temperature, performing a second control operation by the controller to suspend generation of the first power by the first motor and to generate the second power by the second motor when the temperature of the first motor is greater than a second temperature, and performing a third control operation by the controller to suspend generation of the second power by the second motor when at least one of the temperature of the first motor and a temperature of the second motor is greater than a third temperature, wherein the second temperature is greater than the first temperature, and the third temperature is greater than the second temperature.

According to an exemplary embodiment, the method may further include receiving temperature information of the first motor and the second motor from a sensor. The controller may be configured to perform the first control operation, the second control operation, and the third control operation in a driving mode in which the first motor and the second motor generate power for charging a battery using a driving torque received from an engine.

The performing of the second control operation may include performing a control operation to operate the second motor to generate the second power that corresponds to maximum producible power. Additionally, the performing of the first control operation may include performing a control operation by the controller to reduce the driving torque at the first motor received from the engine, and transmitting a driving torque that corresponds to the reduced driving torque to the second motor. The first motor may be a driving motor, and the second motor may be a hybrid starter & generator (HSG) motor.

In another aspect of the present invention, a motor control apparatus may include a communication unit configured to exchange a signal with a first motor and a second motor, a controller configured to execute a control operation to reduce first power generated by the first motor and to operate the second motor to generate second power that corresponds to the reduced first power when a temperature of the first motor is greater than a first temperature, execute a control operation to suspend generation of the first power by the first motor and generate the second power by the second motor when the temperature of the first motor is greater than a second temperature, or suspend generation of the second power by the second motor when at least one of the temperature of the first motor and a temperature of the second motor is greater than a third temperature, and a memory configured to store the first temperature, the second temperature, and the third temperature, wherein the second temperature may be greater than the first temperature, and the third temperature may be greater than the second temperature.

According to an exemplary embodiment, the apparatus may further include a sensor configured to sense the temperatures of the first motor and the second motor. The controller may be configured to determine whether the temperature of the first motor is greater than the first temperature in a driving mode in which the first motor and the second motor generate power for charging a battery using a driving torque received from an engine. The controller may further be configured to execute a control operation to operate the second motor to generate the second power that corresponds to maximum producible power.

Additionally, the controller may be configured to perform a control operation to operate the first motor to reduce the driving torque received from the engine, and transmit a driving torque that corresponds to the reduced driving torque to the second motor. The first motor may be a driving motor, and the second motor may be an HSG motor. The present invention also provides a computer-readable recording medium recording a program for executing the above-described methods.

BRIEF DESCRIPTION OF THE DRAWINGS

The accompanying drawings are included to provide a further understanding of the invention and provide embodiments of the present invention together with the detailed description. However, a technical characteristic of the invention is not restricted to a particular drawing, and characteristics disclosed in the respective drawings may be combined and configured as a new exemplary embodiment.

DETAILED DESCRIPTION

Figure 1:
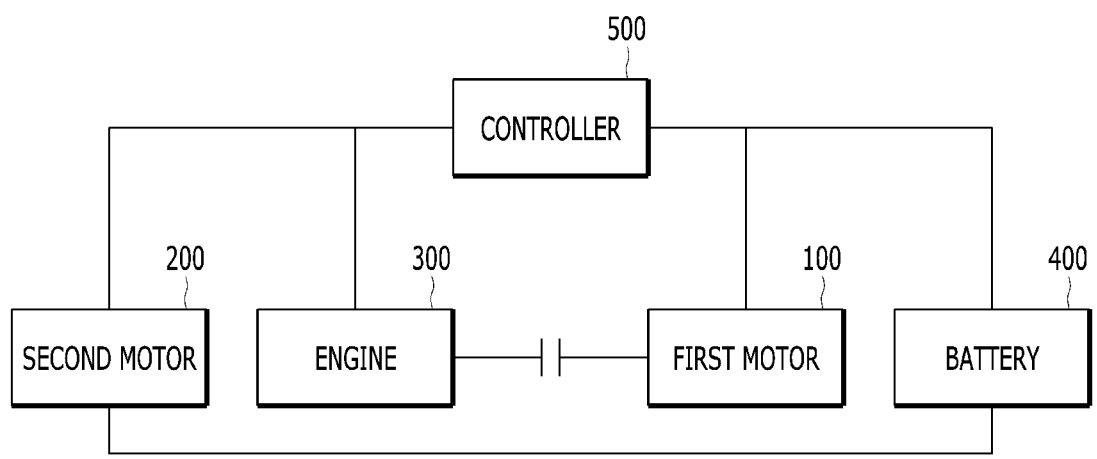
FIG. 1 is a diagram illustrating a motor control system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to an apparatus and various methods to which the exemplary embodiments of the present invention are applied. The suffixes "module" and "unit" of elements herein are used for convenience of description and thus can be used interchangeably and do not have any distinguishable meanings or functions. When a known technology related to description of the invention is clear to those skilled in the art, and thus is determined to unnecessarily obscure the subject matter of the invention, a detailed description thereof will be omitted.

In a plug-in hybrid electric vehicle (PHEV), a temperature of a driving motor affects an output of the driving motor. An excessively high temperature of the driving motor may cause burning of main components (e.g., a permanent magnet, a coil, etc.) and a problem of abnormal operation of the driving motor.

The present invention provides a motor control method and apparatus that allow continuous driving in a charging mode by charging a battery using a hybrid starter & generator (HSG) motor while adjusting a motor torque by determining a level of an excessive temperature of the motor to prevent the driving motor from excessively increasing in temperature.

As an exemplary embodiment of the present invention, the motor control method and apparatus may detect a temperature of the driving motor (hereinafter referred to as a "first motor") using a temperature sensor, and distribute the driving torque (power), applied from an engine to the motor, to the HGS motor (hereinafter referred to as a "second motor") before the temperature of the driving motor reaches a particular level that causes abnormal driving of the vehicle.

A motor control system that delivers the driving torque from the engine to the first motor and the second motor will be briefly described with reference to FIG. 1, and the motor control method will be described as the exemplary embodiment of the present invention with reference to FIGS. 2 and 3. Thereafter, a motor control apparatus will be described with reference to FIG. 4 based on the motor control method, and effects of the motor control method and apparatus will be described with reference to FIG. 5.

FIG. 1 illustrates a motor control system according to an exemplary embodiment of the present invention. The motor control system may include a first motor 100, a second motor 200, an engine 300, a battery 400, and a controller 500. The components illustrated in FIG. 1 are not essential, and thus it may be possible to implement a motor control system having more or fewer components. The controller 500 may be configured to operate the first motor 100, the second motor 200, the engine 300, and the battery 400.

A PHEV may include the first motor (driving motor) 100 that operates as a power source of the vehicle, and the second motor (HSG motor) 200 that operates as a starter of the engine 300 and as a generator during driving. Specifically, the second motor 200 may be connected to the engine 300 to operate as a starter or a generator to adjust a speed of the engine 300. In addition, the engine 300 may be connected to the first motor 100 via a clutch, the first motor 100 may be connected to the battery 400 to charge or discharge the battery 400, and the battery 400 may be connected to an electronic unit to supply current.

The controller 500 may be configured to execute data processing and overall operation of the motor control system. The controller 500 may be configured to drive the first motor 100 and the second motor 200. The battery 400 may be configured to supply electric energy to the first motor 100 in an electric vehicle (EV) mode and a hybrid electric vehicle (HEV) mode, and store electric energy generated in a charging mode. The controller 500 may further be configured to obtain or detect state of charge (SOC) information of the battery 400 using a battery management system (BMS).

To prevent the first motor 100 from overheating, the controller 500 may be configured to monitor a temperature of the first motor 100 in real time, and restrict a driving area when the temperature of the first motor 100 increases to a particular level or greater, thereby preventing damage to the system due to overheating. In other words, when the temperature of the first motor 100 exceeds a threshold, a maximum torque is gradually decreased causing a derating area, in which a rated output is decreased, to be entered. When the derating area is entered, motor usage rapidly decreases. Thus, an increase in temperature may be additionally restricted.

The controller 500 may be configured to generate electric energy by distributing a driving torque generated from the engine 300 to the second motor 200 to continuously maintain the charging mode while restricting driving of the first motor 100. A more detailed function of the controller 500 will be described with reference to FIG. 4.

Figure 2:
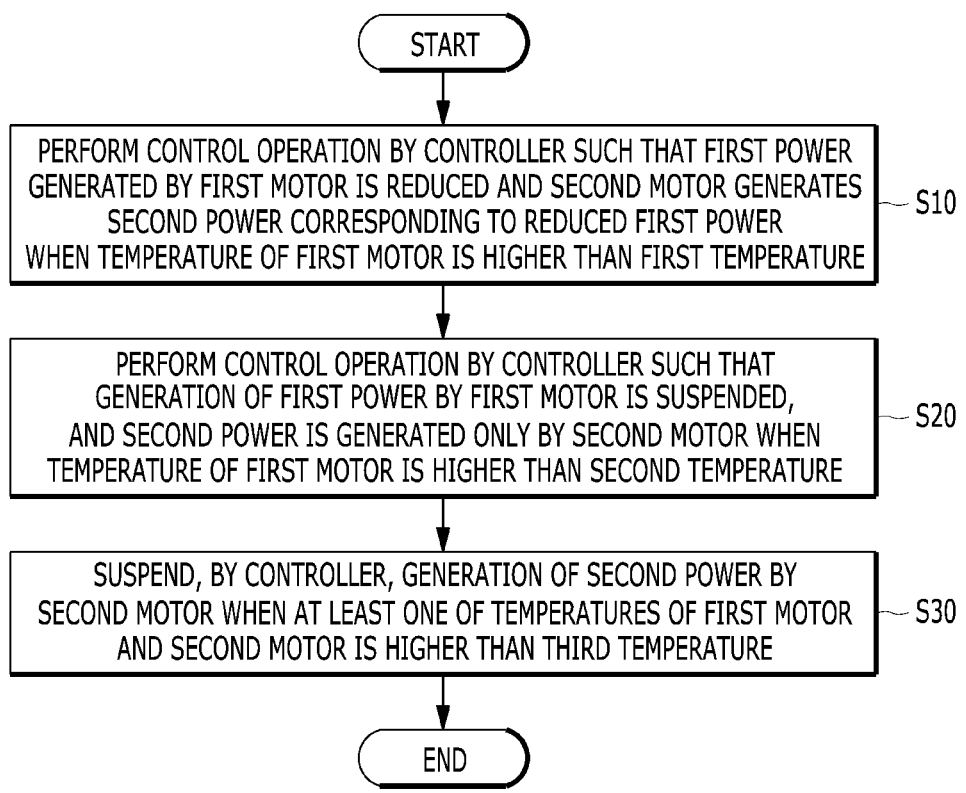
FIG. 2 is a flowchart describing a motor control method according to an exemplary embodiment of the present invention.

FIG. 2 illustrates a motor control method according to an exemplary embodiment of the present invention. When a temperature of the first motor 100 is greater than a first temperature, the controller 500 may be configured to reduce first power generated by the first motor 100 and operate the second motor 200 to generate second power that corresponds to the reduced first power in S10.

The controller 500 may be configured to continuously detect temperature information of the first motor 100 and the second motor 200. The controller 500 may further be configured to receive the temperature information from a temperature sensor configured to sense temperatures of the first motor 100 and the second motor 200. In general, the temperature sensor may be disposed within the first motor 100 and the second motor 200. However, the temperature sensor may be included in the controller 500. The first temperature may be a temperature for reducing generation of the first power by the first motor 100, and may be stored in a memory within the controller 500.

The controller 500 may be configured to reduce generation of the first power by the first motor 100 by gradually decreasing the above-described maximum torque to enter the derating area, in which the rated output is decreased. The controller 500 may additionally be configured to reduce the driving torque received by the first motor 100 from the engine 300 to perform a control operation to generate the second power that corresponds to the reduced power of the first motor 100, and may be configured to transmit a driving torque that corresponds to the reduced driving torque to the second motor 200.

When the temperature of the first motor 100 is greater than a second temperature, the controller 500 may be configured to suspend the generation of the first power by the first motor 100, and the second power may be generated by the second motor 200 in S20. The controller 500 may be configured to continuously determine the temperature information of the first motor 100 and the second motor 200 even when the temperature of the first motor 100 is greater than the first temperature.

The second temperature may be a temperature that is greater than the first temperature, and may be a temperature for suspending charging via the first motor 100. The controller 500 may be configured to transmit the driving torque generated from the engine 300 to the second motor 200 rather than to the first motor 100. In this instance, the controller 500 may be configured to operate the second motor 200 to generate the second power that corresponds to maximum producible power.

When at least one of the temperatures of the first motor 100 and the second motor 200 is greater than a third temperature, the controller 500 may be configured to suspend generation of the second power by the second motor 200 in S30. The third temperature may be a temperature that is greater than the second temperature, and may be a temperature for canceling the charging mode. The controller 500 may be configured to cancel the charging mode by performing a control operation wherein the driving torque of the engine 300 is not delivered to the first motor 100 and the second motor 200.

Figure 3:
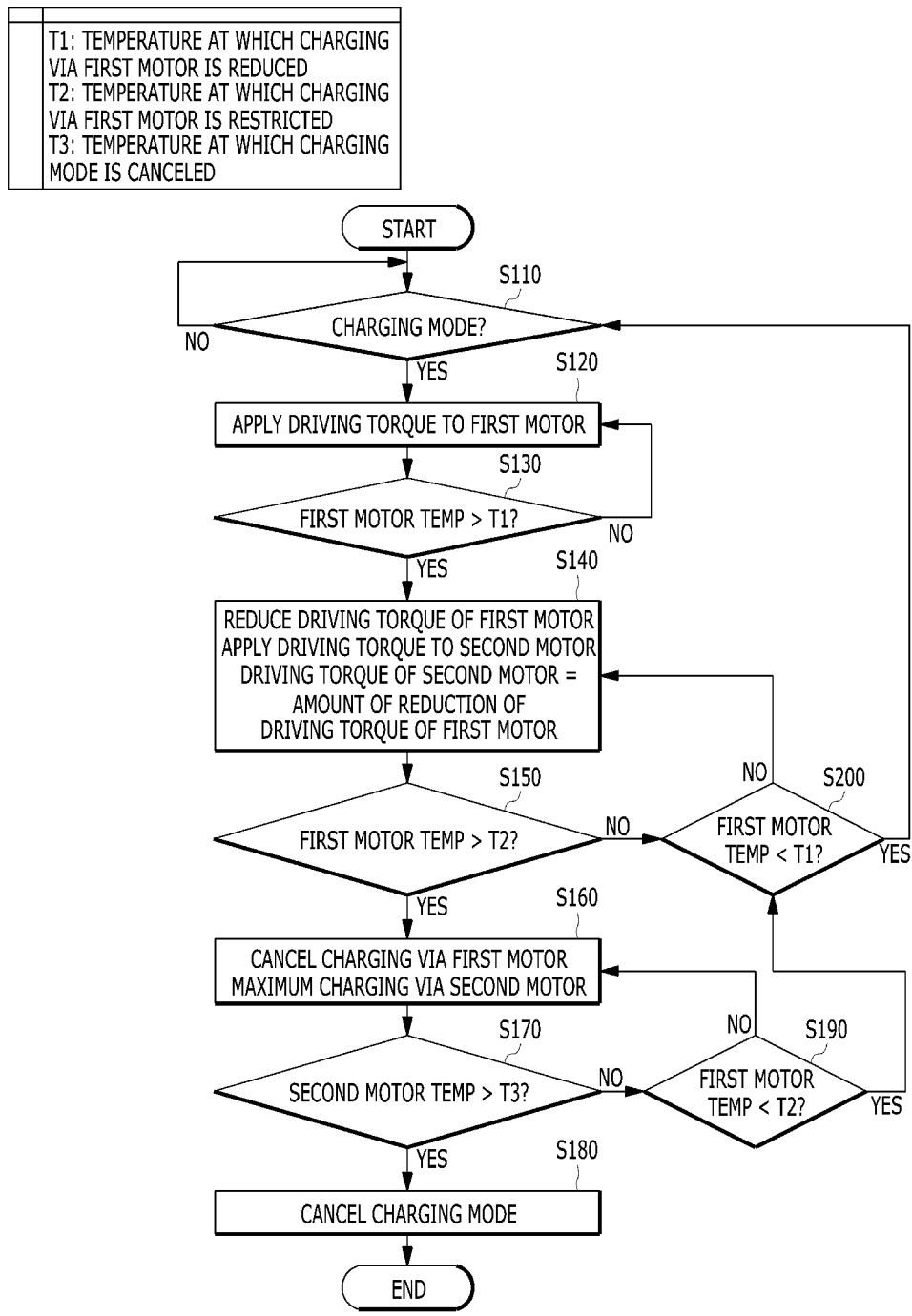
FIG. 3 is a flowchart for detailed description of FIG. 2 according to an exemplary embodiment of the present invention.

FIG. 3 is a flowchart for describing FIG. 2 in more detail. Referring to FIG. 3, the controller 500 may be configured to verify whether the PHEV is in the charging mode in S110. As described in the hereinabove, the PHEV may be driven in the EV mode, the HEV mode and the charging mode, and a driver may select one of the three modes. As an exemplary embodiment of the present invention, the motor control method may be performed when the PHEV is driven in the charging mode. Therefore, the controller 500 may be configured to verify whether the PHEV is in the charging mode.

When the PHEV is driven in the charging mode (Yes in S110), the controller 500 may be configured to apply or transmit the driving torque of the engine 300 to the first motor 100 in S120. When a driving torque by the engine or the motor is greater than a torque required by the driver in the charging mode, power that corresponds to a difference thereof may be used for generation via the motor. In S130, the controller 500 may be configured to receive temperature information from the temperature sensor of the first motor 100, and determine whether the temperature of the first motor 100 is greater than the first temperature.

When the temperature of the first motor 100 is greater than the first temperature (Yes in S130), the controller 500 may be configured to reduce the driving torque delivered to the first motor 100 from the engine 300, and deliver or transmit a driving torque that corresponds to the reduced driving torque to the second motor 200. The first motor 100 may be configured to generate first power reduced by power that corresponds to the reduced driving torque, and the second motor 200 may be configured to generate second power increased by power that corresponds to the additionally received driving torque. Accordingly, the vehicle may be driven in the charging mode in which the battery may be continuously charged by the second motor 200 while an increase in temperature of the first motor 100 may be suppressed.

When the temperature of the first motor 100 is greater than the second temperature (Yes in S150), the controller 500 may be configured to cancel charging via the first motor 100 without delivering the driving torque to the first motor 100 from the engine 300. Instead, the controller 500 may be configured to maximally generate second power which may be generated by the second motor 200 using the driving torque delivered to the second motor 200 from the engine 300 in S160. When the temperature of the second motor 200 is greater than the third temperature (Yes in S170), the controller 500 may be configured to cancel the charging mode in S180.

When the temperature of the second motor 200 is less than the third temperature (No in S170), and the temperature of the first motor 100 is less than the second temperature (No in S190), the controller 500 may be configured to continuously perform charging by generating maximum second power which may be generated by the second motor 200 using the second motor 200 in S160.

Figure 4:
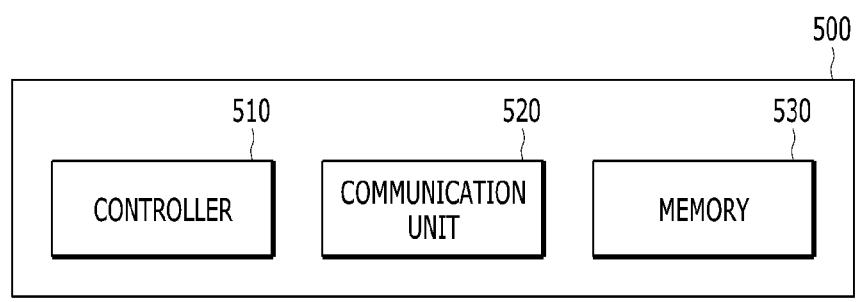
FIG. 4 is a diagram illustrating a motor control apparatus according to an exemplary embodiment of the present invention.

FIG. 4 illustrates a motor control apparatus 500 according to an exemplary embodiment of the present invention. Referring to FIG. 4, the motor control apparatus 500 may include a controller 510, a communication unit 520, and a memory 530. The controller 510 may be configured to operate the communication unit 520 and the memory 530. The components illustrated in FIG. 4 are not essential, and thus it may be possible to implement the motor control apparatus 500 which has more or fewer components. Hereinafter, the components will be described in detail.

The controller 510 may be configured to perform data processing and operation to operate the motor control apparatus 500. As an exemplary embodiment, the controller 510 may be configured to reduce first power generated by a first motor and operate a second motor to generate second power that corresponds to the reduced first power when a temperature of the first motor is greater than a first temperature, suspend generation of the first power by the first motor and generate the second power using only the second motor when the temperature of the first motor is greater than a second temperature, or suspend generation of the second power by the second motor when at least one of the temperatures of the first motor and the second motor is greater than a third temperature. For example, the temperature T1 can be 80 degrees Celsius to 90 degrees Celsius, the temperature of T2 can be 90 degrees Celsius to 110 degrees Celsius, the temperature T3 can be a 110 degrees Celsius.

The communication unit 520 may be configured to exchange a signal and data for performing motor control with the first motor 100, the second motor 200, the engine 300, and the battery 400. The memory 530 refers to a general space and/or storage area that stores predetermined program code for executing overall operation of the motor control apparatus 500, data which is input/output when operation by the program code is performed, etc., and may be provided in a form of an electrically erasable and programmable read only memory (EEPROM), a flash memory (FM), a hard disk drive (HDD), etc. For example, the memory 530 may be configured to store information regarding the first temperature, the second temperature, and the third temperature.

Figure 5:
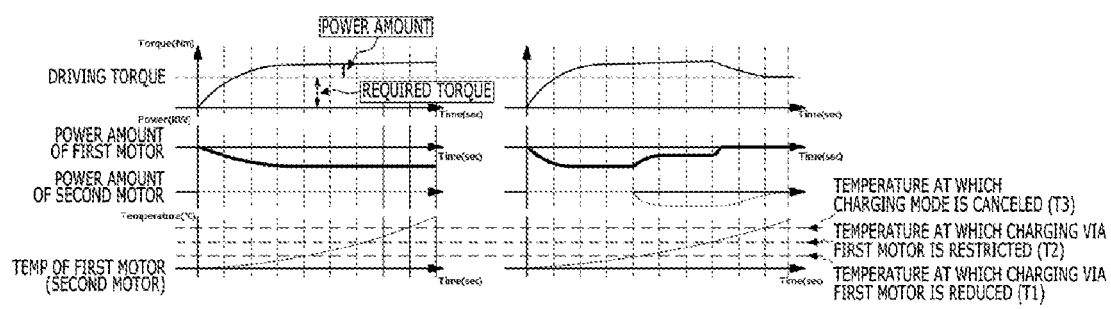
FIG. 5 is a diagram illustrating effects of the motor control method and the motor control apparatus according to an exemplary embodiment of the present invention.

FIG. 5 is a diagram for description of effects of the motor control method and apparatus according to an exemplary embodiment of the present invention. Referring to the left graphs of FIG. 5, a driving torque of an engine greater than a required torque generates power in a first motor. A negative sign of the graphs indicates that power is generated by the first motor.

As the first motor continuously generates power, a temperature of the first motor may continuously increase. As a result, charging of a battery may be suspended due to the overheated first motor, and a problem occurs since the vehicle may not be driven in the EV mode by the overheated first motor. The right graphs of FIG. 5 are the same as the left graph in that a driving torque of the engine is greater than a required torque. A right graph of a power amount of the first motor is the same as the left one when the temperature of the first motor is less than the first temperature. However, when the temperature of the first motor increases to be greater than the first temperature, first power of the first motor may decrease, and a power amount of the second motor may increase.

The method according to the exemplary embodiments described above may be manufactured as a program to be executed on a computer and stored in a computer-readable recording medium. Examples of the computer-readable recording medium include a read only memory (ROM), a random access memory (RAM), a CD-ROM, a magnetic tape, a floppy disk, an optical data storage device, etc. In addition, the computer-readable recording medium may also be implemented in the form of a carrier wave (for example, transmission over the Internet). The computer-readable recording medium may be distributed in a computer system connected by a network, and computer-readable code may be stored and executed in a distributed manner. In addition, a functional program, code, and code segments for implementing the above-described method may be easily inferred by programmers of a technical field to which the embodiments pertain.

Effects of the battery charging control method and apparatus of the motor system according to the present invention are described below.

First, the present invention may prevent a driving motor from being overheated by distributing a driving torque of an engine to the driving motor and an HSG motor.

Second, the present invention may enhance operability by suppressing a decrease in power performance due to prevention of overheating of a driving motor.

Third, the present invention may increase a charge amount of a battery due to prevention of overheating of a driving motor, and allow driving in an EV mode without difficulty.

Effects that may be obtained from the present invention are not limited to the above-mentioned effects, and other effects not mentioned herein may be clearly understood by those skilled in the art from the above description. Those skilled in the art will appreciate that the present invention may be carried out in other specific ways than those set forth herein without departing from the spirit and essential characteristics of the present invention.

The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are to be embraced therein.

What is claimed is:

1. A motor control method, comprising:
performing, by a controller, a first control operation to reduce first power generated by a first motor and to operate a second motor to generate second power that corresponds to the reduced first power when a temperature of the first motor is greater than a first temperature;
performing, by the controller, a second control operation to suspend generation of the first power by the first motor and to operate the second motor to generate the second power when the temperature of the first motor is greater than a second temperature; and
performing, by the controller, a third control operation to suspend generation of the second power by the second motor when at least one of the temperature of the first motor and a temperature of the second motor is greater than a third temperature,
wherein the second temperature is greater than the first temperature, and the third temperature is greater than the second temperature.

2. The method according to claim 1, further comprising receiving, by the controller, temperature information of the first motor and the second motor from a sensor.

3. The method according to claim 1, wherein the controller is configured to execute the first control operation, the second control operation, and the third control operation in a driving mode in which the first motor and the second motor generate power for charging a battery using a driving torque received from an engine.

4. The method according to claim 3, wherein the execution of the second control operation includes operating the second motor to generate the second power that corresponds to maximum producible power.

5. The method according to claim 3, wherein the execution of the first control operation includes operating the first motor to reduce the driving torque received from the engine, and transmitting a driving torque that corresponds to the reduced driving torque to the second motor.

6. The method according to claim 3, wherein the first motor is a driving motor and the second motor is a hybrid starter & generator (HSG) motor.

7. A motor control apparatus, comprising:
a communication unit configured to exchange a signal with a first motor and a second motor;
a controller configured to:
reduce first power generated by the first motor and operate the second motor to generate second power that corresponds to the reduced first power when a temperature of the first motor is greater than a first temperature; and
suspend generation of the first power by the first motor and operate the second motor to generate the second power when the temperature of the first motor is greater than a second temperature, or suspend generation of the second power by the second motor when at least one of the temperature of the first motor and a temperature of the second motor is greater than a third temperature; and
a memory configured to store the first temperature, the second temperature, and the third temperature,
wherein the second temperature is greater than the first temperature, and the third temperature is greater than the second temperature.

8. The apparatus according to claim 7, further comprising:
a sensor configured to detect the temperatures of the first motor and the second motor.

9. The apparatus according to claim 7, wherein the controller is configured to determine whether the temperature of the first motor is greater than the first temperature in a driving mode in which the first motor and the second motor generate power for charging a battery using a driving torque received from an engine.

10. The apparatus according to claim 7, wherein the controller is configured to operate the second motor to generate the second power corresponding to maximum producible power.

11. The apparatus according to claim 7, wherein the controller is configured to operate the first motor to reduce the driving torque received from the engine, and transmit a driving torque that corresponds to the reduced driving torque to the second motor.

12. The apparatus according to claim 7, wherein the first motor is a driving motor and the second motor is an HSG motor.

13. A non-transitory computer readable medium containing program instructions executed by a processor or controller, the computer readable medium comprising:
program instructions that reduce first power generated by a first motor and control a second motor to generate second power that corresponds to the reduced first power when a temperature of the first motor is greater than a first temperature;
program instructions that suspend generation of the first power by the first motor and control the second motor to generate the second power when the temperature of the first motor is greater than a second temperature; and
program instructions that suspend generation of the second power by the second motor when at least one of the temperature of the first motor and a temperature of the second motor is greater than a third temperature,
wherein the second temperature is greater than the first temperature, and the third temperature is greater than the second temperature.

14. The non-transitory computer readable medium of claim 13, further comprising:
program instructions that receive temperature information of the first motor and the second motor from a sensor.

15. The non-transitory computer readable medium of claim 13, wherein the program instructions are executed in a driving mode in which the first motor and the second motor generate power for charging a battery using a driving torque received from an engine.

16. The non-transitory computer readable medium of claim 15, further comprising:
program instructions that control the second motor to generate the second power that corresponds to maximum producible power.

17. The non-transitory computer readable medium of claim 15, further comprising:
program instructions that control the first motor to reduce the driving torque received from the engine, and transmitting a driving torque that corresponds to the reduced driving torque to the second motor.

* * * * *